(No Model.)
J. W. PRIDMORE.
CORN HARVESTER.
No. 585,698.  Patented July 6, 1897.
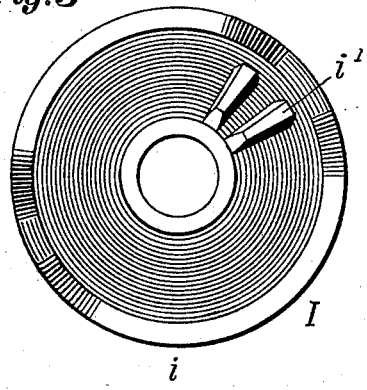
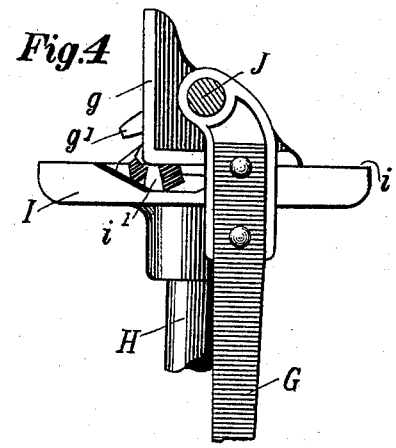
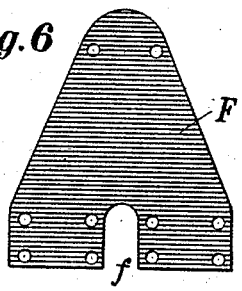
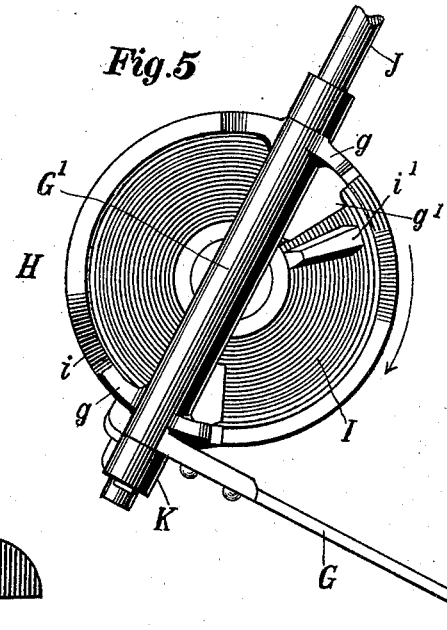
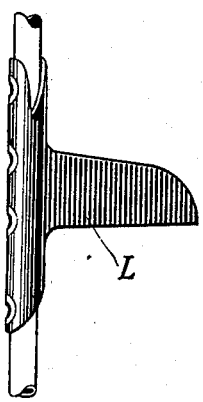
WITNESSES:
J. M. Culver.
E. F. Weston.
INVENTOR
John W. Pridmore
BY R. B. Swift.
ATTORNEY.

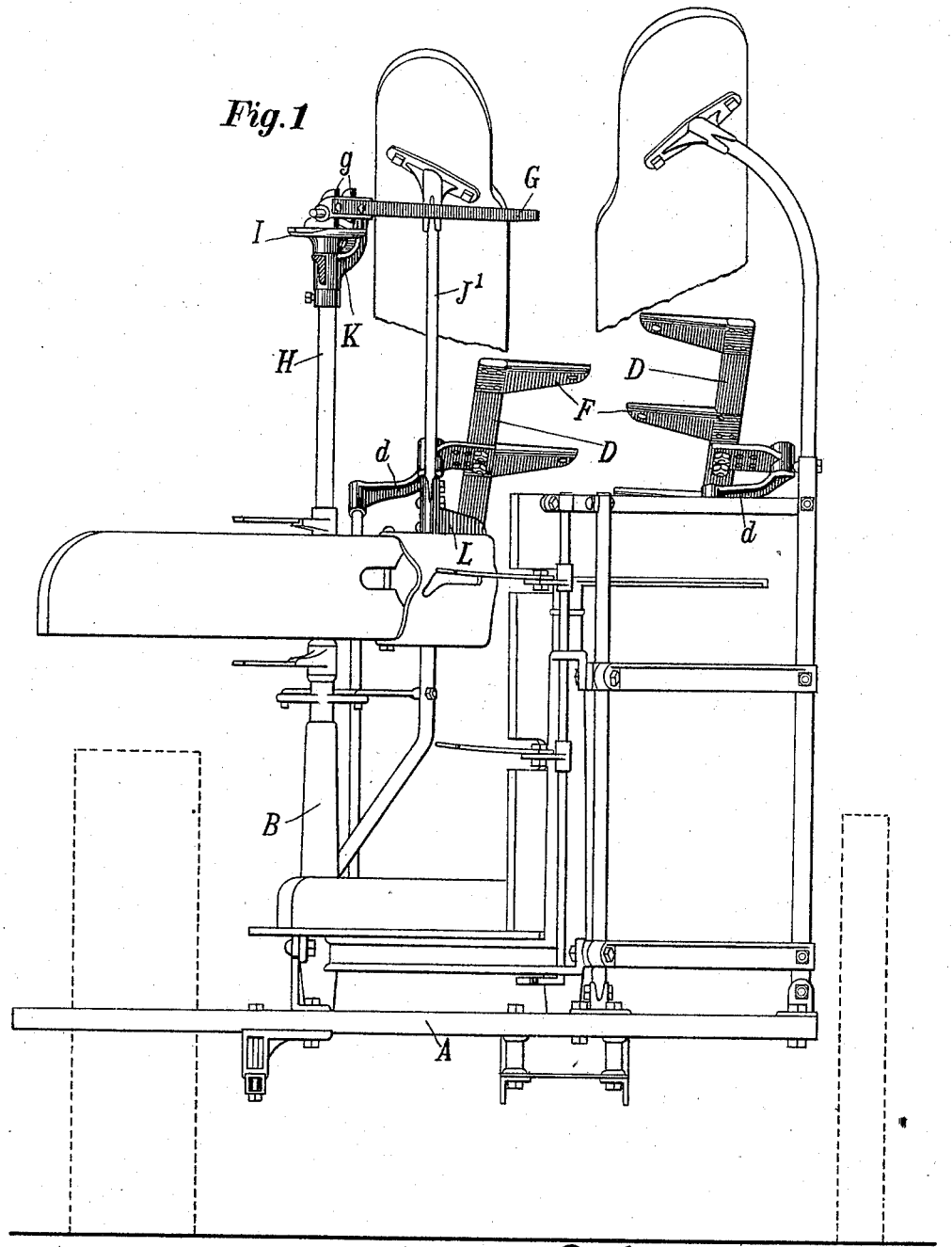

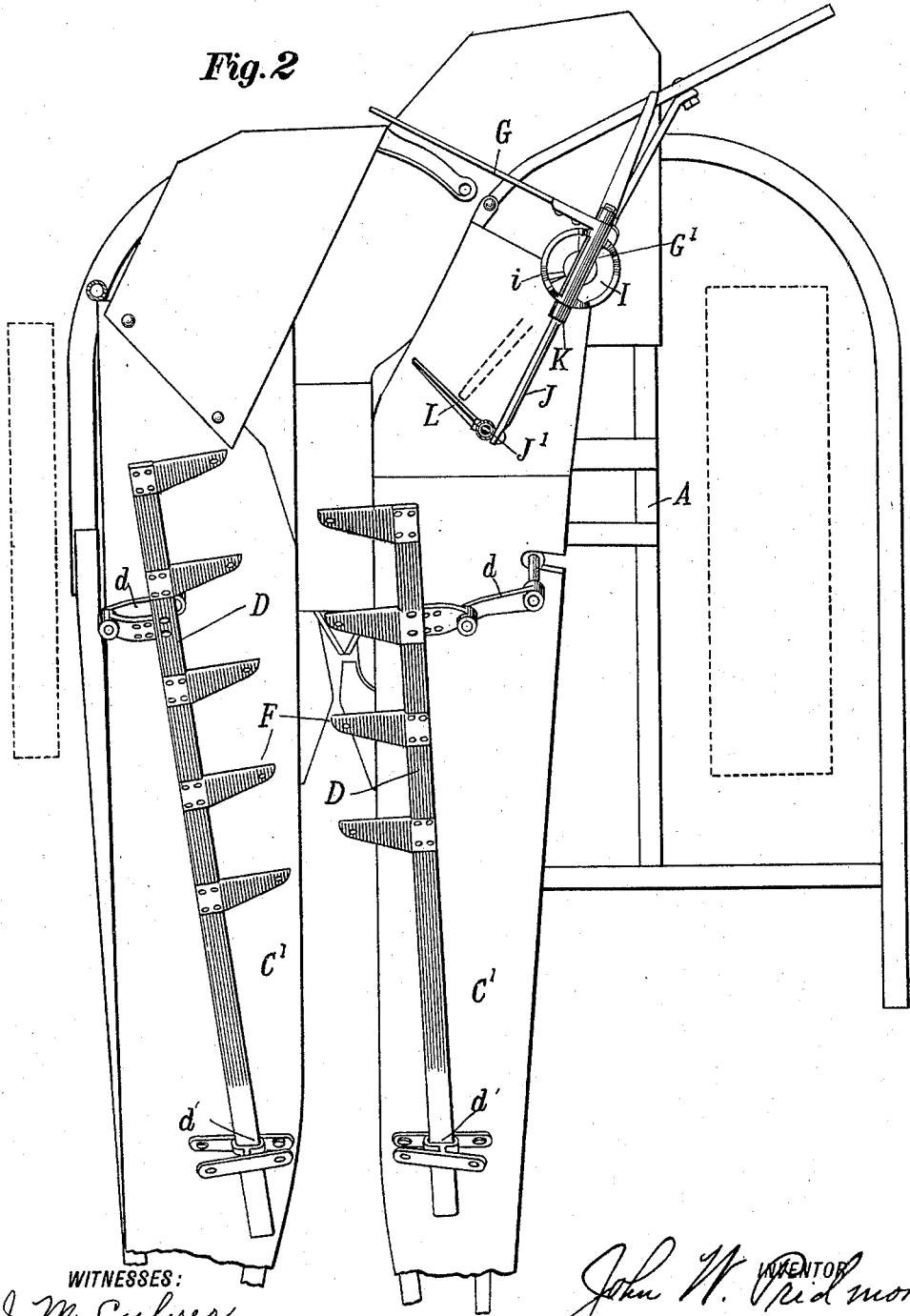

UNITED STATES PATENT OFFICE.

JOHN W. PRIDMORE, OF CHICAGO, ILLINOIS, ASSIGNOR TO THE McCORMICK HARVESTING MACHINE COMPANY.

CORN-HARVESTER.

SPECIFICATION forming part of Letters Patent No. 585,698, dated July 6, 1897.

Application filed December 14, 1896. Serial No. 615,671. (No model.)

*To all whom it may concern:*

Be it known that I, JOHN W. PRIDMORE, a citizen of the United States, residing at Chicago, in the county of Cook and State of Illinois, have invented a new and useful Improvement in Machines for Harvesting Corn, of which the following is a specification.

My invention relates to improvements in corn-harvesting machines in which gathering-prongs upon which are positioned forwarding devices gather the corn and conduct it rearwardly to a binder positioned vertically at the rear of these gathering-prongs; and the objects of my improvements are, first, to provide a tooth for the reciprocating rakes that can be made inexpensively and attached to the rake-bar without weakening it; second, to provide a retarder for the tops of corn at the rear of the binding-receptacle, and, third, to provide a stop to prevent the ears of corn from passing back onto the shield that covers the knotting devices where these ears are caught by the discharge-arm in its rotation, thus causing the discharge-arm to be bent and in some cases the machine to be clogged. I obtain these objects by the mechanism illustrated in the accompanying drawings, in which—

Figure 1 is a rear view of so much of the corn-harvesting machine as is necessary to show my improvements. Fig. 2 is a top view of the machine as it appears after the removal of the top-gathering boards. Figs. 3, 4, and 5 are detailed enlarged views of the mechanism for the top-retarder. Fig. 6 is a view of one of the teeth on the forwarding-rakes as it appears when stamped from a sheet of metal, and Fig. 7 is a view of the stop that keeps the corn from passing back onto the knotter-shield.

Similar letters refer to similar parts throughout the several views.

The wheels of the machine are shown in the drawings in dotted lines and in their proper positions, but unattached to the machine. It is, however, to be understood that they are fitted with gearing and connected with gearing upon the framework A of the harvester in the usual well-known ways. The binder B is of the usual type and is positioned on the frame of the machine as is common in the corn-harvesters of the well-known Peck type, while the gathering-prongs C conduct the corn standing on end to this binder, as in the Peck machine.

In lodged and tangled corn or in tall corn that is blown forward it has been found necessary to provide mechanism to lift the lodged and fallen stocks and to move the corn backwardly into the machine against the force of the wind. This mechanism has in some instances taken the form of reciprocating rakes D, the delivery ends of which are actuated by cranks $d$, and the receiving ends of which are guided in fixed ways $d'$. These rakes are positioned on the gathering-prongs so as to act upon the stalks toward their upper ends. When the corn is badly lodged and green, it is of great weight, and it takes a large amount of power to lift the fallen stalks and carry them backwardly. It has been common to form these rakes of bars of wood, into which pins or rake-teeth are driven. These holes weaken the bars so that they will not stand the necessary strain. Iron pipe has been used to which teeth have been fastened with rivets, but the same fault has been found. In my improvement bars D are used, to which are fastened teeth F. These teeth are stamped from sheets of metal and are formed so as to encircle the bar, being bent upon themselves so as to be of a double thickness when positioned on the bar, thus giving increased strength, as the sides form braces to prevent the teeth being bent out of position. In the drawings of the rakes shown in Figs. 1 and 2 the bars D are shown to be of wood, and the plan view of the tooth shown in Fig. 6 shows holes for the attachment of this tooth to the wood. Experience has shown that these teeth should be securely fastened to the wooden bar by wrought clout-nails of sufficient length to be riveted, and that the bars will not be weakened. The teeth can be formed so that they will be of a sufficient length to penetrate the corn and slim enough so that they will enter the stream of corn without trouble and still have sufficient strength. It will be noticed that the tooth F is slotted at $f$, so as to allow the sides to overlap the rake-bar.

The next feature of my invention relates to a device for retarding the tops of the corn. Experience in the operation of corn-binders that bind the corn while standing on end has shown that the corn must be kept as nearly upright during the binding operation as is possible. If the corn is inclined, the butts of the bundle will not be square, the needle will encircle the bundle at an angle, and the band will, when the corn is stood into the shock and squared up, be loose, while the whole operation of the binding attachment is found more satisfactory if the corn stands as nearly vertical as possible. A tops-retarding arm G has therefore been provided to stand across the path of the outgoing bundle of corn while the bundle is in the course of formation, and in order that the bundle may be discharged it is connected with an operative machine to throw it out of the path of the corn at the proper interval. In the plan shown in the drawings the knotting-shaft H has been extended, and to the extremity of it a cam-wheel I has been fixed. This wheel is provided with a flange $i$ and cogs $i'$. The tops-retarding arm G is rigidly fastened at its inner end to a sleeve G', that is mounted upon an arm J, that extends across the top of the cam-wheel, the inner end of which is connected to the post J', that supports the rear end of the inner gathering-prong, while the outer end is held in position by the forked sleeve K, which is held in position by the knotting-shaft H, and with arms extending on both sides of the cam-wheel I furnishes a bearing for the arm J, thus holding it in position above the face of the cam and preventing the arm having any sidewise motion. The sleeve G', to which the tops-retarding arm G is attached, is fitted with angular flanges $g$, one at either end, and upon these flanges cogs $g'$ are positioned in the path of the cogs $i'$ on the cam-wheel I. The flanges $g$ are positioned in the path of the flange $i$ on the cam-wheel. The flange $i$ on the cam-wheel is cut away on opposite sides, so that the tops-retarding arm G can be raised and lowered at proper intervals on the rotation of the knotting-shaft H. During the time of receiving of the bundle the tops-retarding arm G stands across the path of the outgoing bundle, the binding mechanism is out of connection with the main part of the machine, and the knotting-shaft H is at rest. When, however, a bundle has accumulated and the binder been thrown into action in the well-known ways, the knotting-shaft H begins its revolution, and when the cogs $i'$ on the cam-wheel I strike the cogs $g'$ on the flange $g$ the arm is rotated, the flange $i$ being cut away so that the flange $g$ will allow the arm to vibrate. As shown in the drawings, from the direction of rotation of the cam-wheel the arm would drop down the side of the bundle and swing out of the path of the outgoing bundle. It is evident, however, that by placing the cogs in a different position on the cam they could engage first with the other end of the sleeve G' and the arm be raised. It has, however, been found that it is preferable to drop the arm, inasmuch as when it comes back into action it starts from below, and any tops of the oncoming swath of corn that have been drawn back by the outgoing bundle will be straightened, whereas if it on its return movement came down from the top it might strike so as to leave part of the tops on the outgoing side.

In the practical operation of a corn-harvesting machine of the Peck type in the field certain conditions are encountered that produce delays, which are not only annoying to the operator of the machine, but prevent a reasonable amount of work being accomplished. Since the introduction of the Peck vertical corn-binder trouble has been encountered, and various means have been tried to prevent the ears of corn from sliding back onto the shield that covers the knotting mechanism and being struck by the discharge-arm, which rolls upon them, springing the discharge-arm out of position, bending the shield, increasing draft, and frequently causing breakage and clogging of the binder. The discharge-arm has been entirely shielded; but this prevents the operator from getting at the knotting mechanism. The discharge-arm has been raised above the shield over the knotter, so that ears would pass between it and the knotting-shield; but it is then too far from the needle and does not enter the division between the bundle and the stream behind that has been opened for it by the forked needle. In the drawings is shown a practical inexpensive means of preventing the ears from getting beneath the discharge-arm in a diagonally-placed stop or flange L. It is located just outside the sweep of the discharge-arm, as shown in Fig. 2, where the end of the discharge-arm is shown in dotted lines, and prevents the ears of corn from sliding back up the gathering-prongs C. In the drawings it is shown attached at its inner end to the post J'.

Having now described my invention, what I claim, and desire to secure by Letters Patent, is—

1. A forwarding device for moving the corn onwardly in a corn-machine, consisting of a reciprocating rake-bar having a series of teeth attached thereto, the teeth being formed of sheets of metal triangular in shape and bifurcated on the side of the angle that is to form the base of the tooth, and then bent on a line from the center of the bifurcation to the apex of the opposite angle, whereby the angles upon the same side of the sheet as the bifurcation are brought together and the bifurcated portions of the sheet are attached on opposite sides of the rake-bar, substantially as and for the purpose specified.

2. As an article of manufacture to form the teeth for the reciprocating, forwarding devices in a self-binding corn-harvester, a triangular sheet of metal, bifurcated at its base, whereby flanges are formed that, when the metal is bent to form a tooth, project upon opposite sides of the bar, substantially as and for the purpose specified.

3. In combination in a self-binding harvesting-machine, to form a retarder for the corn, an arm projecting across the path of the corn, practically in a line with the outer side of the forming bundle, a cam positioned on an operative shaft of the binder, a sleeve to which the arm is rigidly attached, mounted along the face of the cam, and devices on the cam and sleeve to move the arm as desired, substantially as and for the purpose specified.

4. In combination with the gathering-arms, forwarding devices and the vertical binding attachment of a self-binding corn-harvester, an arm positioned across the path of the forming-gavel and attached to a sleeve having a flange and cogs upon one end, to throw the arm in one direction, and upon the other end, to throw the arm in the other direction, a cam-wheel formed with a flange broken at opposite sides, and with cogs to mesh with the cogs on the sleeve, an arm upon which the sleeve is mounted, to hold it in proper relation to the face of the cam, a shaft on the binder to give movement to the cam, whereby, when the binder binds and discharges a bundle, the retaining-arm will be moved out of the path of the bundle, and when the bundle has been discharged, be returned into the path of the oncoming stream of corn.

5. In combination in a corn-binding machine, with the gathering-prongs, forwarding devices, and an upright binder positioned behind these devices, a discharge-arm on the binder, and an upstanding flange which is positioned just outside the sweep of the discharge-arm as it enters the corn passage-way whereby the ears of corn are prevented from lying on the prong and being caught between the discharge-arm and the prong.

JOHN W. PRIDMORE.

Witnesses:
J. M. CULVER,
R. B. SWIFT.